United States Patent
Moriki et al.

(10) Patent No.: US 9,366,012 B2
(45) Date of Patent: Jun. 14, 2016

(54) ELECTRICALLY DRIVEN WORKING VEHICLE

(71) Applicant: HITACHI CONSTRUCTION MACHINERY CO., LTD., Tokyo (JP)

(72) Inventors: Hidekazu Moriki, Tokyo (JP); Satoru Kaneko, Tokyo (JP); Masatoshi Hoshino, Tokyo (JP); Takashi Ikimi, Tsuchiura (JP); Noritaka Ito, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 36 days.

(21) Appl. No.: 14/377,566

(22) PCT Filed: Feb. 13, 2013

(86) PCT No.: PCT/JP2013/053396
§ 371 (c)(1),
(2) Date: Aug. 8, 2014

(87) PCT Pub. No.: WO2013/122101
PCT Pub. Date: Aug. 22, 2013

(65) Prior Publication Data
US 2015/0047916 A1   Feb. 19, 2015

(30) Foreign Application Priority Data

Feb. 17, 2012   (JP) .................................. 2012-033263

(51) Int. Cl.
*B60W 10/26*   (2006.01)
*B60K 6/46*   (2007.10)
(Continued)

(52) U.S. Cl.
CPC ................. *E02F 9/2075* (2013.01); *B60K 6/46* (2013.01); *B60K 6/52* (2013.01); *B60L 7/14* (2013.01); *B60L 7/18* (2013.01); *B60L 11/005* (2013.01); *B60L 11/126* (2013.01); *B60L 11/14* (2013.01);
(Continued)

(58) Field of Classification Search
CPC ....... E02F 9/2075; E02F 9/207; E02F 9/2091; B60K 6/46; B60L 11/14; B60W 30/18045; B60W 2300/17; Y02T 10/642
See application file for complete search history.

(56) References Cited

U.S. PATENT DOCUMENTS

2012/0004797 A1* 1/2012 Baino .................... B60K 6/48
701/22

FOREIGN PATENT DOCUMENTS

| JP | 2005-9381 A | 1/2005 |
|---|---|---|
| JP | 2005-12900 A | 1/2005 |

(Continued)

*Primary Examiner* — Michael J Zanelli
(74) *Attorney, Agent, or Firm* — Baker Botts L.L.P.

(57) ABSTRACT

An electrically driven working vehicle that requiring reduced power assistance from an electrical storage device is provided. The vehicle has an engine, a generator motor connected to the engine, a generator inverter for controlling the amount of power generated by the generator motor, a traveling motor for driving the vehicle, an electrical storage device connected to the generator inverter and the traveling motor, and a forward/reverse switching device for switching the traveling direction of the vehicle. The vehicle further includes a control device for outputting to the generator inverter an instruction to increase the amount of power generated by the generator motor when the voltage of the electrical storage device is equal to or lower than a maximum voltage level and a speed signal of the traveling motor given upon switching of the forward/reverse switching device is equal to or lower than a predetermined speed.

10 Claims, 8 Drawing Sheets

(51) Int. Cl.

| | | |
|---|---|---|
| *B60L 11/14* | (2006.01) | |
| *E02F 9/20* | (2006.01) | |
| *B60W 10/08* | (2006.01) | |
| *B60W 20/00* | (2016.01) | |
| *B60L 7/14* | (2006.01) | |
| *B60L 7/18* | (2006.01) | |
| *B60L 11/00* | (2006.01) | |
| *B60L 11/12* | (2006.01) | |
| *B60W 10/06* | (2006.01) | |
| *E02F 9/22* | (2006.01) | |
| *B60K 6/52* | (2007.10) | |
| *B60W 30/18* | (2012.01) | |

(52) U.S. Cl.
CPC ............... *B60W 10/06* (2013.01); *B60W 10/08* (2013.01); *B60W 20/00* (2013.01); *E02F 9/207* (2013.01); *E02F 9/2079* (2013.01); *E02F 9/2083* (2013.01); *E02F 9/2091* (2013.01); *E02F 9/2095* (2013.01); *E02F 9/2296* (2013.01); *B60L 2200/42* (2013.01); *B60L 2210/30* (2013.01); *B60L 2210/40* (2013.01); *B60L 2240/421* (2013.01); *B60L 2240/423* (2013.01); *B60L 2240/526* (2013.01); *B60L 2240/527* (2013.01); *B60L 2240/529* (2013.01); *B60L 2240/547* (2013.01); *B60L 2250/26* (2013.01); *B60W 30/18045* (2013.01); *B60W 2300/17* (2013.01); *B60W 2510/244* (2013.01); *Y02T 10/6217* (2013.01); *Y02T 10/6265* (2013.01); *Y02T 10/6286* (2013.01); *Y02T 10/642* (2013.01); *Y02T 10/7022* (2013.01); *Y02T 10/7077* (2013.01); *Y02T 10/7241* (2013.01); *Y10S 903/903* (2013.01)

(56) References Cited

FOREIGN PATENT DOCUMENTS

| JP | 2008-120120 A | | 5/2008 |
|---|---|---|---|
| JP | 2008-201391 A | | 9/2008 |
| JP | 2011-098680 A | | 5/2011 |
| JP | 2012-62726 A | | 3/2012 |
| WO | WO2012/128181 | * | 9/2012 |

* cited by examiner

ELECTRICALLY DRIVEN WORKING VEHICLE

TECHNICAL FIELD

The present invention relates to an electrically driven working vehicle.

BACKGROUND ART

Among conventional working vehicles is a wheel loader including an engine, a hydraulic pump connected mechanically to the output shaft of the engine, hydraulic actuators operated with the fluid supplied from the hydraulic pump, a torque converter type automatic transmission connected mechanically to the output shaft of the engine, and a forward/reverse switch (this wheel loader will be referred to as the torque converter vehicle hereunder).

The torque converter vehicle has a modulation function that decelerates the vehicle when the forward/reverse switch is set to the opposite of the current traveling direction of the vehicle. In modulation mode, the gear of the automatic transmission is switched to reverse the rotation direction of the input shaft and that of the output shaft of the torque converter so as to generate the braking force through slippage of the torque converter. This allows the torque converter vehicle to decelerate the vehicle without using hydraulic brakes and to proceed to accelerate in the direction designated by the forward/reverse switch.

Meanwhile, there is an electrically driven cargo handling vehicle including an engine, a generator and a hydraulic pump driven by the engine, a travel device that drives rotatively the front and rear running wheels by means of electrical traveling motors powered electrically by the generator, and a cargo handling device and friction brakes driven by hydraulic pressure from the hydraulic pump. On this cargo handling vehicle, the regenerative braking torque of regenerative braking is allotted as the total braking torque for temporarily stopping the vehicle body in order to switch between forward and reverse traveling in a short time. Where the total braking torque is not fully obtained with the regenerative braking torque alone, the shortage of the torque is supplemented with frictional braking torque (e.g., see Patent Document 1).

PRIOR ART DOCUMENTS

Patent Document

Patent Document 1: JP-2008-201391-A

SUMMARY OF THE INVENTION

Problem to be Solved by the Invention

The torque converter vehicle in modulation mode generates braking force by converting the kinetic energy of the vehicle body into losses caused by the slippage of the torque converter. It follows that the engine is subjected continuously to the load for generating the slippage of the torque converter. Because the engine thus generates power continuously in modulation mode, the engine can supply the input shaft without delay with the power necessary for traveling acceleration subsequent to modulation. As a result, the traveling acceleration starting from modulation mode becomes greater than the traveling acceleration from the stopped state.

On the other hand, the electrically driven cargo handling vehicle described in Patent Document 1 generates braking force in modulation mode by converting the kinetic energy of the vehicle body into electrical power by means of an electrical traveling motor and has no need to supply power to the electrical traveling motor. This puts the engine in an unloaded idle state. As a result, the traveling acceleration subsequent to modulation entails slower engine response, and the power shortage is assisted by discharges from an electrical storage device.

For that reason, if the engine is downsized to reduce fuel costs, the assisting power from the electrical storage device necessarily increases, which can lead to premature degradation of the electrical storage device. If such assistance is not available because of low voltage levels of the electrical storage device, the traveling acceleration subsequent to modulation can be slowed.

The present invention has been made in view of the above circumstances, and one object of the invention is to provide an electrically driven working vehicle that receives lower assisting power from an electrical storage device and still provides acceleration at least equivalent to that of torque converter vehicles.

Means for Solving the Problem

In achieving the above object and according to a first embodiment of the present invention, there is provided an electrically driven working vehicle having an engine, a generator motor connected mechanically to the engine, a generator inverter for controlling the amount of power generated by the generator motor, a traveling motor for driving a vehicle body, an electrical storage device connected electrically to the generator inverter and to the traveling motor, and a forward/reverse switching device for switching the traveling direction of the vehicle body. The electrically driven working vehicle includes a control device for outputting to the generator inverter an instruction to increase the amount of power generated by the generator motor when the voltage of the electrical storage device is equal to or lower than a maximum voltage level and a speed signal of the traveling motor given upon switching of the forward/reverse switching device is equal to or lower than a predetermined speed.

According to a second embodiment of the present invention, there is provided an electrically driven working vehicle having an engine, a generator motor connected mechanically to the engine, a generator inverter for controlling the amount of power generated by the generator motor, a traveling motor for driving a vehicle body, an electrical storage device connected electrically to the generator inverter and to the traveling motor, and a forward/reverse switching device for switching the traveling direction of the vehicle body. The electrically driven working vehicle includes: a voltage detection device for detecting the voltage of the electrical storage device; a speed detection device for detecting a speed signal of the traveling motor, and a control device for receiving the voltage of the electrical storage device detected by the voltage detection device and the speed signal detected by the speed detection device, the control device further outputting to the generator inverter an instruction to increase the amount of power generated by the generator motor when the voltage of the electrical storage device is equal to or lower than a maximum voltage level and the speed signal of the traveling motor given upon switching of the forward/reverse switching device is equal to or lower than a predetermined speed that is higher than zero.

As a third embodiment of the present invention according to the first or the second embodiment thereof, when the voltage of the electrical storage device is equal to or lower than the maximum voltage level and the speed signal of the traveling motor is equal to or lower than the predetermined speed that is higher than zero, the control device may output to the generator inverter an instruction to bring the amount of power generated by the generator motor higher the closer to zero the speed signal of the traveling motor is gradually reduced.

As a fourth embodiment of the present invention according to the second or the third embodiment thereof, the control device may further include: a modulation determination device for determining that modulated operation is underway when the direction indicated by the forward/reverse switching device is different from the direction of the speed signal of the traveling motor, the modulation determination device further determining that unmodulated operation is underway when the direction indicated by the forward/reverse switching device is the same as the direction of the speed signal of the traveling motor; and a requested charging power calculation device for receiving a modulation determination signal from the modulation determination device, the requested charging power calculation device outputting to the generator inverter the instruction to bring the amount of power generated by the generator motor in modulated operation higher than in unmodulated operation when the speed signal of the traveling motor is equal to or lower than the predetermined speed that is higher than zero.

As a fifth embodiment of the present invention according to any one of the first through the third embodiments thereof, the electrically driven working vehicle may further include: a brake operation device for decelerating the vehicle body; a second voltage detection device for detecting the voltage of the traveling motor; and a current detection device for detecting the current of the traveling motor. The control device may include: a traveling power acquisition device for calculating requested traveling power by receiving the voltage of the traveling motor detected by the second voltage detection device and the current of the traveling motor detected by the current detection device; a brake determination device for calculating either a brake ON signal or a brake OFF signal on the basis of a brake signal from the brake operation device; and a second requested charging power calculation device for receiving a brake determination signal from the brake determination device, the second requested charging power calculation device outputting to the generator inverter the instruction to bring the amount of power generated by the generator motor given the brake OFF signal higher than given the brake ON signal when the requested traveling power from the traveling power acquisition device is equal to or less than the predetermined power.

As a sixth embodiment of the present invention according to any one of the second through the fifth embodiments thereof, the higher the voltage of the electrical storage device detected by the voltage detection device, the lower the control device may set the predetermined speed that is higher than zero.

Effect of the Invention

According to the present invention, when the electrically driven working vehicle is in modulation mode, the amount of power generated by the generator motor is raised to boost engine output power beforehand. This allows the electrically driven working vehicle to require less assisting power from the electrical storage device for traveling acceleration subsequent to modulation while obtaining acceleration at least equivalent to that of torque converter vehicles. As a result, the forward/reverse switching operation of the electrically driven working vehicle is performed rapidly so that the efficiency of excavating, loading, and transporting earth and sand is improved.

MODE FOR CARRYING OUT THE INVENTION

Explained below with reference to the accompanying drawings is a hybrid wheel loader as an electrically driven working vehicle embodying the present invention. Incidentally, this invention can also be applied to vehicles working in modulated operation such as hybrid forklifts and is not limited in application to the hybrid wheel loader.

First Embodiment

Figure 1:
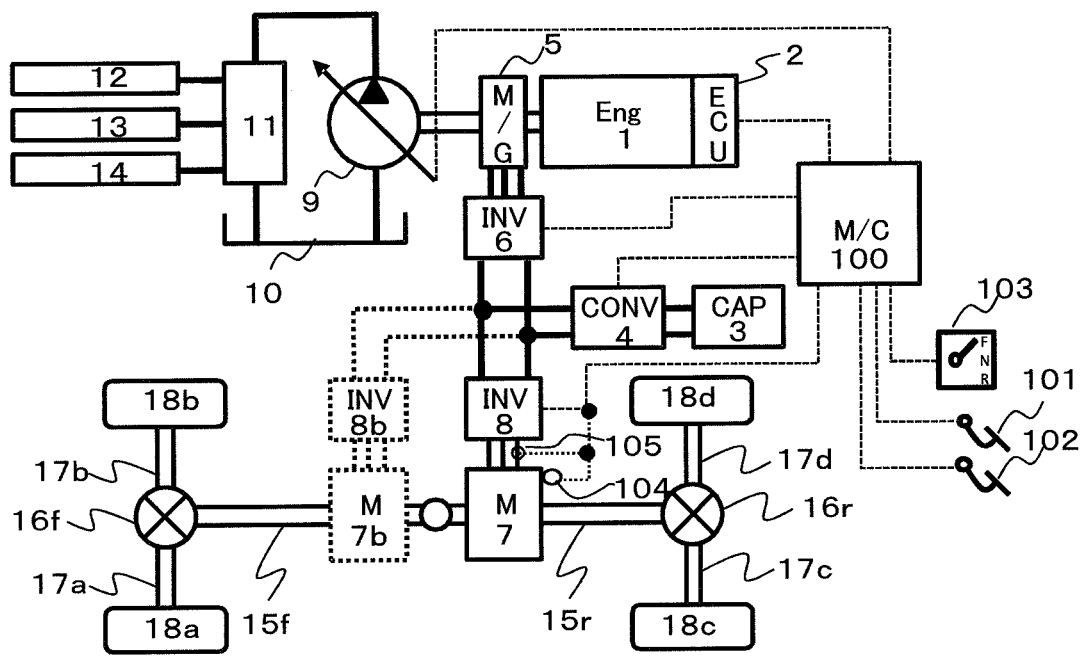
FIG. 1 is a system configuration diagram of electric-hydraulic equipment constituting a first embodiment of an electrically driven working vehicle according to the present invention.

FIG. 1 is a system configuration diagram of electric-hydraulic equipment constituting the first embodiment of the electrically driven working vehicle according to the present invention. In FIG. 1, the hybrid wheel loader includes an engine 1, an engine controller 2 for controlling the engine 1, a capacitor 3 acting as an electrical storage device, a converter 4 for controlling the charging and discharging of the capacitor 3, a generator motor 5 connected mechanically to the engine 1, a generator inverter 6 for driving the generator motor 5, traveling motors 7 and 7b performing powering operation when supplied with electrical power from the generator motor 5 and capacitor 3, traveling inverters 8 and 8b for driving the traveling motors 7 and 7b respectively, and a main controller 100.

The hybrid wheel loader also includes a main pump 9 connected mechanically to the engine 1 and generator motor 5, an oil tank 10 for supplying fluid to the main pump 9, a control valve 11 for distributing the fluid delivered by the main pump 9; and a steer cylinder 12, a lift cylinder 13, and a bucket cylinder 14 moving telescopically when supplied with the fluid distributed by the control valve 11.

Here, the converter 4, generator inverter 6, and traveling inverters 8 and 8b are connected to the same power line and can supply electrical power to one another. Also, the converter 4 monitors the voltage of a smoothing capacitor, not shown, attached to the power line, and charges and discharges the capacitor 3 in a manner keeping the voltage of the smoothing capacitor constant.

The main controller 100 is connected with signal lines coming from an accelerator pedal 101, a brake pedal 102 (brake operation device), a forward/reverse switch 103 (forward/reverse switching device), a voltage sensor 104 of the traveling motor 7, and a current sensor 105 of the traveling motor 7. The signal lines from these components feed an acceleration signal, a brake signal, a forward/reverse switch signal, a voltage signal, and a current signal (the last two from the traveling motor 7) to the main controller 100.

The main pump 9 is a variable displacement pump. The displacement of the main pump 9 is varied by a tilting angle control valve, not shown, which adjusts the tilting angle of the pump. Adjusting the tilting angle makes it possible to control the delivery flow rate at the same revolution speed.

Although FIG. 1 shows a pair of traveling inverters 8 and 8b mounted for the motors 7 and 7b respectively, this is not limitative of the present invention. Alternatively, there may be provided a single motor and a single traveling inverter, or four motors equipped with four traveling inverters. There are no constraints on the number of motors and traveling inverters that may be configured. For purpose of simplification and illustration, a configuration with one motor 7 and one traveling inverter 8 will be explained below.

Upon traveling acceleration of the hybrid wheel loader, the traveling inverter 8 drives the traveling motor 7 for power running. The powering torque generated by the traveling motor 7 is transmitted to tires 18a, 18b, 18c and 18d via propeller shafts 15f and 15r, differential gears 16f and 16r, and drive shafts 17a, 17b, 17c and 17d, thereby accelerating the vehicle.

On the other hand, upon braking during traveling of the hybrid wheel loader, the traveling inverter 8 drives the traveling motor 7 as a generator. The regenerative torque generated by the traveling motor 7 is transmitted to the tires 18a, 18b, 18c and 18d in the same manner as the powering torque to decelerate the vehicle. The power regenerated by the traveling motor 7 is generally charged into the capacitor 3. Also, the hybrid wheel loader of this embodiment has a hydraulic brake control valve and hydraulic brakes, not shown, so that the vehicle may be decelerated with the hydraulic brakes as needed.

Figure 2:
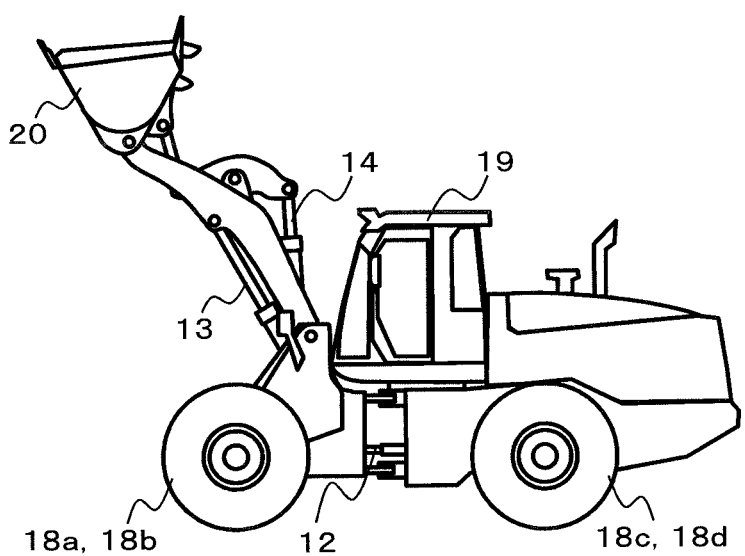
FIG. 2 is a side view of a wheel loader to which the first embodiment of the electrically driven working vehicle of the invention is applied.

FIG. 2 is a side view of a wheel loader to which the first embodiment of the electrically driven working vehicle of the present invention is applied. In FIG. 2, an operator getting on board a cabin 19 can run the vehicle by operating the accelerator pedal 101, brake pedal 102, and forward/reverse switch 103 shown in FIG. 1 to drive the tires 18a, 18b, 18c and 18d. The operator may further swing the vehicle by operating a steering wheel, not shown, to move the steer cylinder 12 telescopically so as to adjust the refractive angle of the vehicle. Also, the operator may perform excavation and cargo handling by operating a lift lever and a bucket lever, not shown, to move the lift cylinder 13 and bucket cylinder 14 telescopically to control the height and tilt of a bucket 20.

Figure 3:
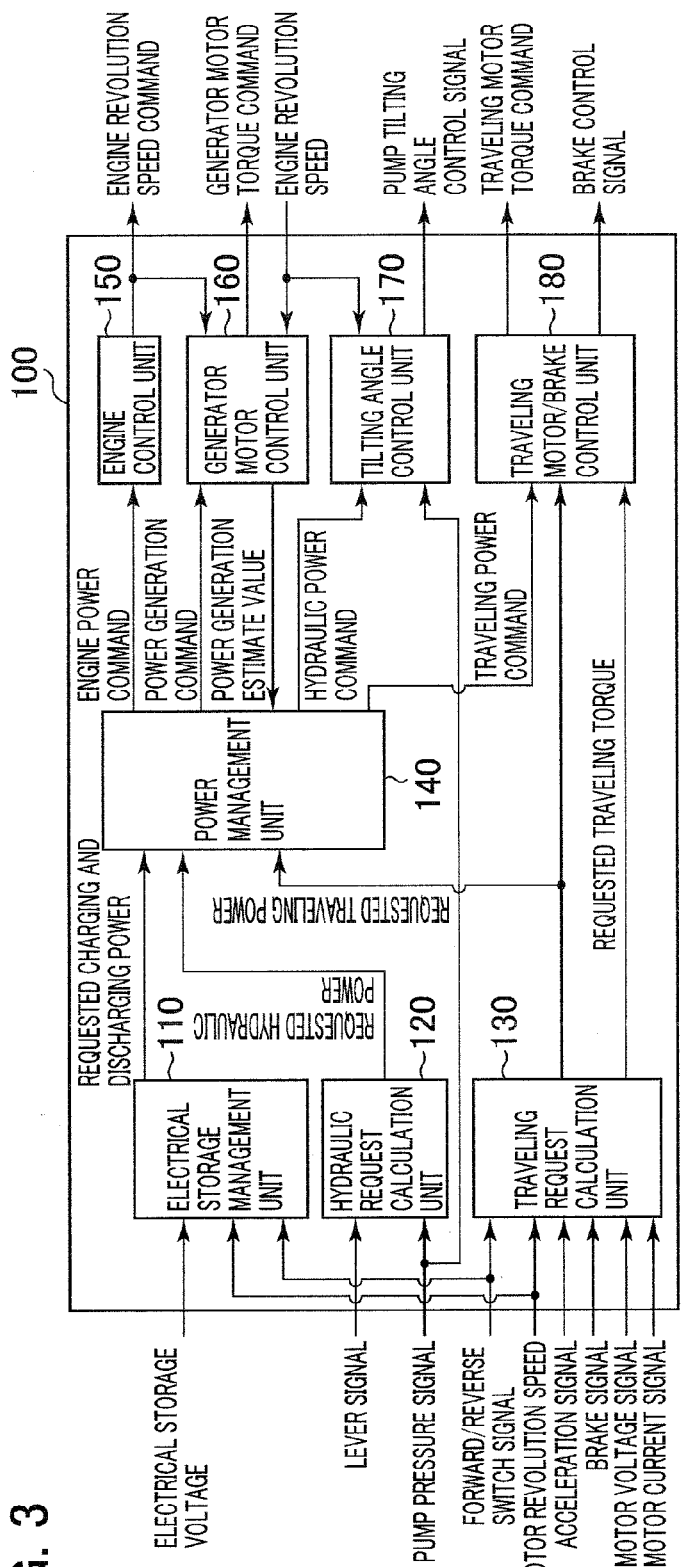
FIG. 3 is a control block diagram of a main controller constituting part of the first embodiment of the electrically driven working vehicle of the invention.
Figure 5:
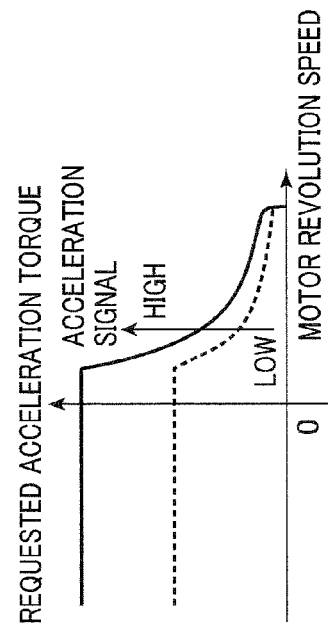
FIG. 5 is a characteristic diagram showing a typical requested acceleration torque map used by a traveling request calculation unit constituting part of the main controller in FIG. 3.
Figure 4:
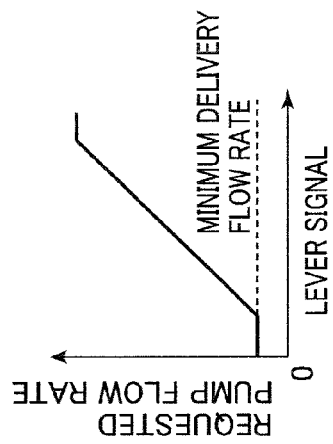
FIG. 4 is a characteristic diagram showing a typical requested pump flow rate map used by a hydraulic request calculation unit constituting part of the main controller in FIG. 3.

The first embodiment of the electrically driven working vehicle of the present invention determines whether modulation is underway on the basis of the forward/reverse switch signal from the forward/reverse switch 103 and the revolution speed of the traveling motor 7. When modulation is determined to be underway, the embodiment prepares for traveling acceleration subsequent to modulation by raising beforehand the electrical power generated by the generator motor 5 (standby power generation), and starts to increase engine output power by putting power generation load on the engine. How these operations are carried out by the main controller 100 will be explained below with reference to FIGS. 3 through 5. FIG. 3 is a control block diagram of the main controller constituting part of the first embodiment of the electrically driven working vehicle of this invention. FIG. 4 is a characteristic diagram showing a typical requested pump flow rate map used by a hydraulic request calculation unit constituting part of the main controller in FIG. 3. FIG. 5 is a characteristic diagram showing a typical requested acceleration torque map used by a traveling request calculation unit constituting part of the main controller in FIG. 3. In FIGS. 3 through 5, the reference characters used in FIGS. 1 through 2 designate like or corresponding parts, and their explanations are omitted hereunder where redundant.

In FIG. 3, the main controller 100 includes an electrical storage management unit 110, a hydraulic request calculation unit 120, a traveling request calculation unit 130, a power management unit 140, an engine control unit 150, a generator motor control unit 160, a tilting angle control unit 170, and a traveling motor/brake control unit 180.

The electrical storage management unit 110 calculates requested charging and discharging power upon receiving the electrical storage voltage of the capacitor 3 from the converter 4, the forward/reverse switch signal from the forward/reverse switch 103, and the revolution speed of the traveling motor 7 as the motor revolutions from the inverter 8. The calculations performed by the electrical storage management unit 110 will be discussed later in detail.

The hydraulic request calculation unit 120 calculates requested hydraulic power upon receiving lever signals from the lift lever and bucket lever as well as a pump pressure from a pressure sensor, not shown, attached interposingly between the hydraulic pump 9 and the control valve 11. For convenience of explanation, it is assumed here that the operation of the steering wheel and the motion of the steer cylinder 12 are not included in the calculations.

First, a requested pump flow rate is calculated from the lever signal by use of the requested pump flow rate map. FIG. 4 shows a typical requested pump flow rate map. In this requested pump flow rate map, the request pump flow rate is set to be approximately proportional to the lever signal. Then given the requested pump flow rate $Q_{PmpReq}$ and pump pressure $P_{rsPmp}$, the mathematical expression (1) given below is used to calculate requested hydraulic power $P_{wrPmpReq}$. For convenience of explanation, it is assumed here that the efficiency of the hydraulic pump 9 is not included in the mathematical expression (1). Likewise, the mathematical expressions hereunder will be explained without pump efficiency taken into account.

[Math. 1]

$$P_{wrPmpReq} = q_{PmpReq} \cdot P_{rsPmp} \tag{1}$$

The traveling request calculation unit 130 calculates (as traveling power acquisition device) requested traveling torque and requested traveling power upon receiving the forward/reverse switch signal from the forward/reverse switch 103, the acceleration signal from the accelerator pedal 101, the brake signal from the brake pedal 102, the revolution speed of the traveling motor 7 as the motor revolutions from the inverter 8, the voltage of the traveling motor 7 from the voltage sensor 104, and the current of the traveling motor 7 from the current sensor 105.

First of all, the requested acceleration torque is calculated from the forward/reverse switch signal, acceleration signal, and motor revolution speed by use of the predetermined requested acceleration torque map. A typical requested acceleration torque map is shown in FIG. 5. In this requested acceleration torque map, the requested acceleration torque is proportional to the acceleration signal at the point where the traveling motor 7 has a maximum torque curve. Besides, the requested acceleration torque is inversely proportional to the motor revolution speed where the motor revolution speed is positive. It should be noted that the requested acceleration torque map of FIG. 5 applies where the forward/reverse switch signal denotes the forward direction. Where the forward/reverse switch signal indicates the reverse direction, a mirror-image map is to be used. Next, the requested traveling torque $T_{rqDrvReq}$ is calculated from the requested acceleration torque $T_{rqAcc}$, forward/reverse switch signal $V_{FNR}$, motor revolution speed $N_{Mtr}$, and brake signal $V_{Brk}$ by use of the mathematical expression (2) below.

[Math. 2]

$$T_{rqDrvReq} = \text{sign}(V_{FNR}) \cdot T_{rqAcc} - \text{sign}(N_{Mtr}) \cdot K_{Brk} \cdot V_{Brk} \tag{2}$$

In the above expression (2), "sign" denotes a signum function that returns 1 where its argument is positive, −1 where the argument is negative, and 0 where the argument is 0. The forward/reverse switch signal VFNR is 1 where the forward/reverse switch is set for the forward direction, −1 where the forward/reverse switch is set for the reverse direction, and 0 where the forward/reverse switch is set for neutral. Also in the above expression (2), $K_{Brk}$ denotes a proportionality constant that is set to provide deceleration in a manner neither added nor subtracted when the brake pedal is operated.

Then the requested traveling power $P_{wrDrvReq}$ is calculated from the requested traveling torque $T_{rqDrvReq}$ and motor revolution speed $N_{Mtr}$ by use of the mathematical expression (3) below.

[Math. 3]

$$P_{wrDrvReq} = T_{rqDrvReq} \cdot N_{Mtr} \tag{3}$$

Whereas the requested traveling power was calculated above from the requested traveling torque and motor revolution speed, the requested traveling power may be calculated alternatively on the basis of the revolution speed of the traveling motor 7 and a torque estimate value or a torque command value. As another alternative, as shown in FIG. 3, the traveling request calculation unit 130 may be supplied with the current and voltage of the traveling motor 7 to calculate the requested traveling power.

The power management unit 140 calculates a traveling power command, a power generation command, a hydraulic power command, and an engine power command upon receiving the requested charging and discharging power from the electrical storage management unit 110, the requested hydraulic power from the hydraulic request calculation unit 120, the requested traveling power from the traveling request calculation unit 130, and a power generation estimate value from the generator motor control unit 160, respectively.

First, the power generation command $P_{wrGenRef}$ is calculated from the requested traveling power $P_{wrDrvReq}$ and requested charging power $P_{wrCapReq}$ by use of the mathematical expression (4) below.

[Math. 4]

$$P_{wrGenRef} = P_{wrCapReq} + P_{wrDrvReq} \tag{4}$$

Next, the engine power command $P_{wrEngRef}$ is calculated from the power generation command $P_{wrGenRef}$ and requested hydraulic power $P_{wrPmpReq}$ by use of the mathematical expression (5) below.

[Math. 5]

$$P_{wrEngRef} = P_{wrGenRef} + P_{wrPmpReq} \tag{5}$$

The traveling power command $P_{wrDrvRef}$ is calculated from the requested traveling power $P_{wrDrvReq}$, requested charging power $P_{wrCapReq}$, and power generation estimate value $P_{wrGen}$ by use of the mathematical expression (6) below.

[Math. 6]

$$P_{wrDrvRef} = \min\{P_{wrDrvReq}, P_{wrGen} - \min(P_{wrCapReq}, 0)\} \tag{6}$$

The hydraulic power command $P_{wrPmpRef}$ is calculated from the requested hydraulic power $P_{wrPmpReq}$ and power generation command $P_{wrGenRef}$ by use of the mathematical expression (7) below.

[Math. 7]

$$P_{wrPmpRef} = \min(P_{wrPmpReq}, P_{wrEngMax} - P_{wrGenRef}) \tag{7}$$

In the above expression (7), $P_{wrEngMax}$ stands for maximum engine power.

On the basis of the engine power command received from the power management unit 140, the engine control unit 150 calculates an operating point where engine efficiency becomes the highest, by use of an engine fuel consumption contour line map, not shown, and determines the engine revolution speed at that operating point to be the engine revolution speed command.

The generator motor control unit 160 receives the engine revolution speed from the engine controller 2. The generator motor control unit 160 calculates a generator motor torque command $T_{rqGenRef}$ from the engine revolution speed $N_{Eng}$, power generation command $P_{wrGenRef}$, and engine revolution speed command $N_{EngRef}$ by use of the mathematical expression (8) below, and transmits the generator motor torque command $T_{rqGenRef}$ to the generator inverter 6.

[Math. 8]

$$T_{rqGenRef} = \max\{K_{Eng}(N_{EngRef} - N_{Eng}), 0\} - \frac{P_{wrGenRef}}{N_{Eng}} \quad (8)$$

In the above expression (8), $K_{Eng}$ stands for a proportional gain regarding the deviation of the engine revolution speed.

Next, the power generation estimate value $P_{wrGen}$ is calculated from the engine revolution speed $N_{Eng}$ and generator motor torque command $T_{rqGenRef}$ by use of the mathematical expression (9) below.

[Math. 9]

$$P_{wrGen} = -N_{Eng} \cdot T_{rqGenRef} \quad (9)$$

The tilting angle control unit 170 calculates a tilting angle control signal $V_{DpRef}$ from the engine revolution speed $N_{Eng}$, hydraulic power command $P_{wrPmpRef}$ and pump pressure $P_{rsPmp}$ by use of the mathematical expression (10) below, and drives the tilting angle control valve accordingly.

[Math. 10]

$$V_{DpRef} = K_{Dp} \frac{P_{wrPmpRef}}{P_{rsPmp} \cdot N_{Eng}} \quad (10)$$

In the above expression (10), $K_{Dp}$ stands for a proportionality constant.

The traveling motor/brake control unit 180 calculates a traveling motor torque command $T_{rqMtrt}$ from the traveling power command $P_{wrDrvRef}$, requested traveling power $P_{wrDrvReq}$, and requested traveling torque $T_{rqDrvReq}$ by use of the mathematical expression (11) below, and transmits the calculated traveling motor torque command $T_{rqMtrt}$ to the traveling inverter 8.

[Math. 11]

$$T_{rqMtrRef} = \frac{T_{rqDrvReq}}{R_D} \frac{P_{wrDrvRef}}{P_{wrDrvReq}} \quad (11)$$

In the above expression (11), $R_D$ stands for the speed reduction ratio of the differential gear 16. Also, when the requested traveling power $P_{wrDrvReq}$ is zero, the traveling motor torque command $T_{rqMtrRef}$ is assumed to be zero.

Next, a brake control signal $V_{BrkRef}$ is calculated from the motor revolution speed $N_{Mtr}$, requested traveling torque $T_{rqDrvReq}$, and traveling torque command $T_{rqMtrRef}$ by use of the mathematical expression (12) below, and the hydraulic brake control valve is driven accordingly.

[Math. 12]

$$V_{BrkRef} = K_{Brk} \cdot \max\{-\text{sign}(N_{Mtr}) \cdot (T_{reqDrvReq} - R_D \cdot T_{rqMtrRef}), 0\} \quad (12)$$

In the above expression (12), $K_{Brk}$ stands for a proportionality constant.

Figure 6:
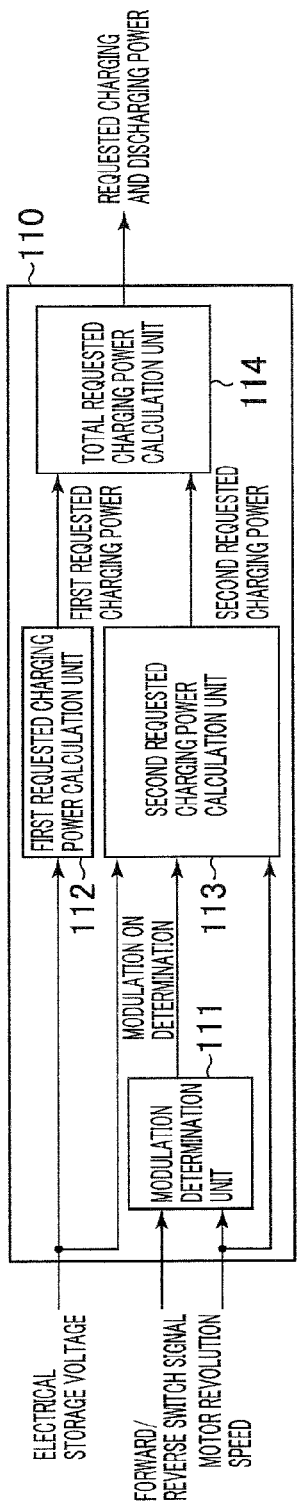
FIG. 6 is a control block diagram showing a structure of an electrical storage management unit constituting part of the main controller in FIG. 3.
Figure 7:
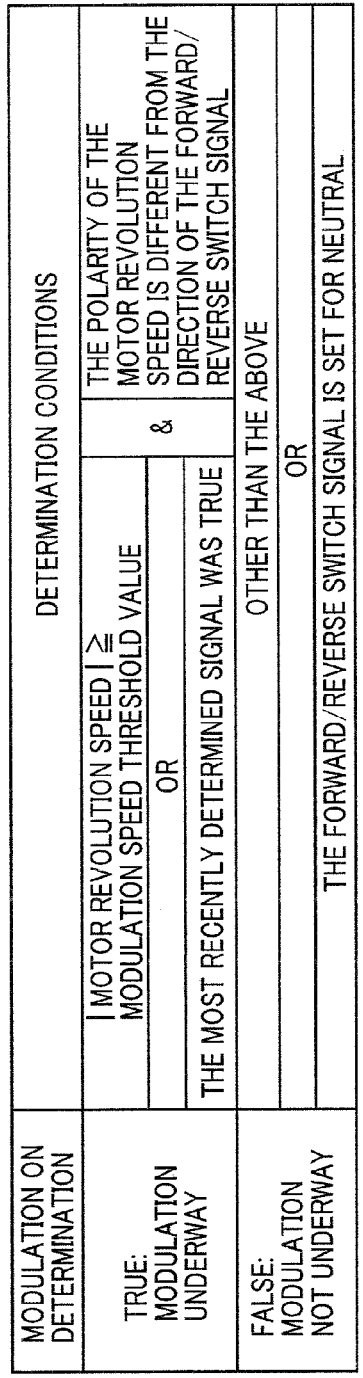
FIG. 7 is a tabular view showing a typical calculation method of a modulation determination unit constituting part of the electrical storage management unit in FIG. 6.
Figure 8:
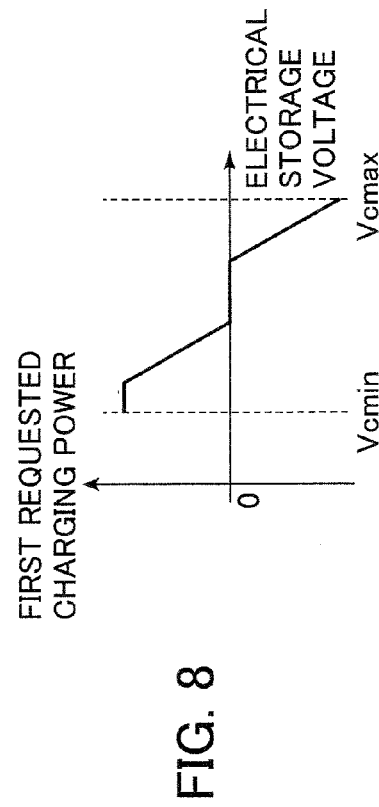
FIG. 8 is a characteristic diagram showing a typical map used by a first requested charging power calculation unit constituting part of the electrical storage management unit in FIG. 6.
Figure 9:
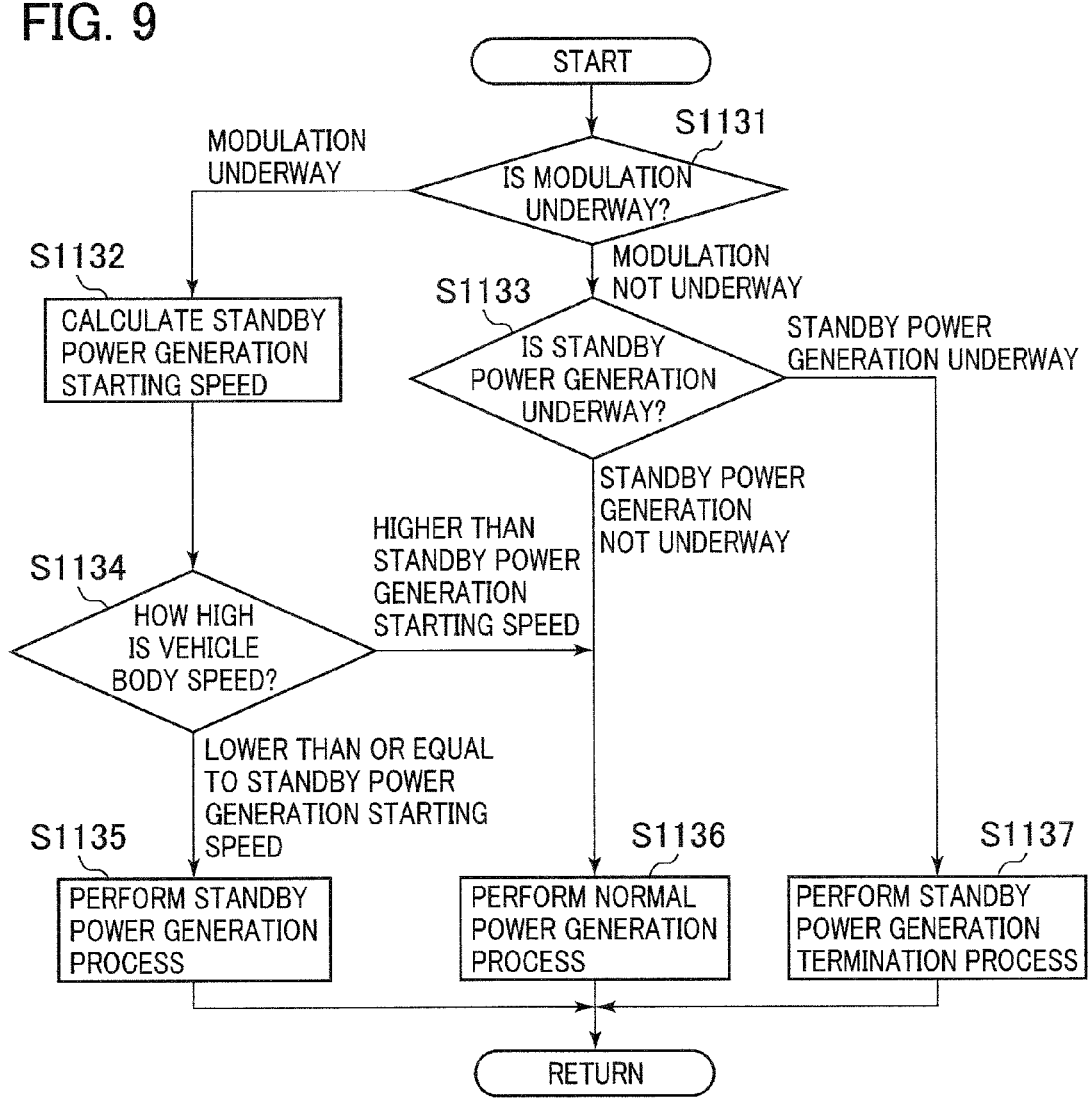
FIG. 9 is a flowchart showing a flow of calculations performed by a second requested charging power calculation unit constituting part of the electrical storage management unit in FIG. 6.
Figure 10:
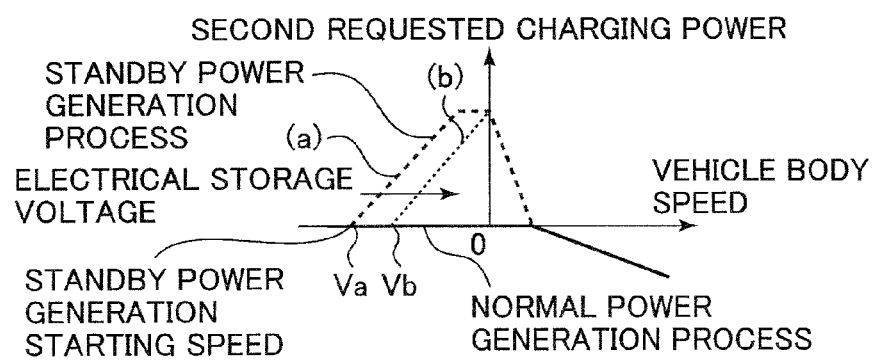
FIG. 10 is a characteristic diagram explaining a normal power generation process and a standby power generation process performed by the first embodiment of the electrically driven working vehicle of the invention.

The electrical storage management unit 110 is explained below in detail with reference to FIGS. 6 through 10. FIG. 6 is a control block diagram showing a structure of the electrical storage management unit constituting part of the main controller in FIG. 3. FIG. 7 is a tabular view showing a typical calculation method of a modulation determination unit constituting part of the electrical storage management unit in FIG. 6. FIG. 8 is a characteristic diagram showing a typical map used by a first requested charging power calculation unit constituting part of the electrical storage management unit in FIG. 6. FIG. 9 is a flowchart showing a flow of calculations performed by a second requested charging power calculation unit constituting part of the electrical storage management unit in FIG. 6. FIG. 10 is a characteristic diagram explaining a normal power generation process and a standby power generation process performed by the first embodiment of the electrically driven working vehicle of the present invention. In FIGS. 6 through 10, the reference characters used in FIGS. 1 through 5 designate like or corresponding parts, and their explanations are omitted hereunder where redundant.

In FIG. 6, the electrical storage management unit 110 includes a modulation determination unit 111 (modulation determination device), a first requested charging power calculation unit 112, a second requested charging power calculation unit 113, and a total requested charging power calculation unit 114.

The modulation determination unit 111 calculates a modulation ON signal on the basis of the forward/reverse switch signal and motor revolution speed. FIG. 7 shows a typical method for calculating the modulation ON signal. When either the absolute value of the motor revolution speed is larger than or equal to a modulation speed threshold value or the most recently determined signal was true (modulation underway), and when the polarity of the motor revolution speed (direction) is different from the direction of the forward/reverse switch signal, the signal is determined to be true (modulation underway). Here, the modulation speed threshold value is set for the motor revolution speed corresponding to the creep speed of the vehicle (e.g., 1 km/h).

The first requested charging power calculation unit 112 calculates the first requested charging power on the basis of the electrical storage voltage. FIG. 8 shows a typical map for calculating the first requested charging power from the electrical storage voltage. In FIG. 8, Vcmin and Vcmax denote the minimum and the maximum voltages of the capacitor 3, respectively. During normal operation, control is performed in such a manner that the voltage of the capacitor 3 falls between these two voltage limits. This is achieved by bringing the first requested charging power higher on the positive side (charging side) the lower the electrical storage voltage, and by bringing the first requested charging power higher on the negative side (discharging side) the higher the electrical storage voltage.

The second requested charging power calculation unit 113 calculates the second requested charging power on the basis of the electrical storage voltage, modulation ON determination, and motor revolution speed. The calculations performed by the second requested charging power calculation unit 113 will be discussed later in detail.

The total requested charging power calculation unit 114 calculates the requested charging power $P_{wrCapReq}$ from the first requested charging power $P_{wrCapReq1}$ and second requested charging power $P_{wrCapReq2}$ by use of the mathematical expression (13) below.

[Math. 13]

$$P_{wrCapReq} = \begin{cases} \max(P_{wrCapReq1}, P_{wrCapReq2}) & (P_{wrCapReq1} > 0) \\ P_{wrCapReq2} & (P_{wrCapReq1} = 0) \\ \min(P_{wrCapReq1}, P_{wrCapReq2}) & (P_{wrCapReq1} < 0) \end{cases} \quad (13)$$

When the sign of the first requested charging power is given priority in this manner, overcharge and over-discharge can be prevented unfailingly. Although it is possible simply to add up the first and the second requested charging power, this should preferably entail establishing an upper limit and a lower limit on the requested charging power.

The calculations performed by the second requested charging power calculation unit 113 are explained below in detail with reference to FIGS. 9 and 10.

FIG. 9 shows a flowchart of calculations performed by the second requested charging power calculation unit 113. First in step S1131, it is determined whether modulation is underway. If the modulation ON signal is determined to be true, step S1132 is reached; if the modulation ON signal is determined to be false, step S1133 is reached.

In step S1132, a standby power generation starting speed is calculated. Step S1132 is followed by step S1134. Here, standby power generation refers to increasing beforehand the power generated by the generator motor 5 prior to traveling acceleration, i.e., raising the output power of the engine 1 preparatory to power generation load on the rise.

The standby power generation starting speed is calculated on the basis of the electrical storage voltage. When standby power generation is started, the power generated by the generator motor 5 charges the capacitor 3. Thus when the electrical storage voltage reaches the maximum voltage of the capacity 3, standby power generation cannot continue. If the electrical storage voltage is low, then the chargeable capacity of the capacitor 3 is large. It follows that the absolute value of the standby power generation starting speed is enlarged and that standby power generation is started earlier. On the other hand, if the electrical storage voltage is high, then the chargeable capacity of the capacitor 3 is small. In this case, the absolute value of the standby power generation starting speed is made smaller, and the start of standby power generation is delayed.

In step S1134, it is determined which of the vehicle body speed and the standby power generation starting speed is the higher. If it is determined that the absolute value of the actual vehicle body speed is lower than or equal to the standby power generation starting speed, step S1135 is reached; if it is determined that the absolute value of the actual vehicle body speed is higher than the standby power generation starting speed, step S1136 is reached.

In step S1135, a standby power generation underway flag is set to be true, and the standby power generation process is performed. In step S1136, the standby power generation underway flag is set to be false, and the normal power generation process is carried out. A method for calculating the second requested charging power for the standby and the normal power generation processes will be discussed later.

In step S1133, on the other hand, it is determined whether standby power generation is underway. If it is determined that the standby power generation underway flag is true, step S1137 is reached; if the standby power generation underway flag is determined to be false, step S1136 is reached.

In step S1137, a standby power generation termination process is performed. The standby power generation termination process involves gradually lowering the second requested charging power to zero and, when the power is reduced to zero, setting the standby power generation underway flag to be false.

The normal power generation process and the standby power generation process are now explained below with reference to FIG. 10. FIG. 10 shows a map in effect when the forward/reverse switch signal denotes the forward direction. If the forward/reverse switch signal represents the reverse direction, a mirror-image map is to be used.

In FIG. 10, the horizontal axis represents the vehicle body speed and the vertical axis denotes the second requested charging power. Thick solid lines in the drawing stand for the second requested charging power to be calculated in the normal power generation process, and doted lines (a) and (b) represent the second requested charging power to be calculated in the standby power generation process.

Where the vehicle body speed is in the negative domain and modulation is not underway, the normal power generation process is performed to set the second requested charging power to zero because there is no need to put positive load on the engine 1.

On the other hand, where the vehicle body speed is in the negative domain and modulation is underway, the standby power generation process is performed to gradually raise the engine output power preparatory to traveling acceleration. During the standby power generation process, the second requested charging power is made higher as the vehicle body speed becomes lower than the standby power generation starting speed Va or Vb (shift toward the right-hand side in the drawing). Following transition from modulation to traveling acceleration, the standby power generation termination process is carried out to reduce the second requested charging power to zero.

When standby power generation is started, the power generated by the generator motor 5 charges the capacitor 3. Thus when the electrical storage voltage reaches the maximum voltage of the capacitor 3, standby power generation cannot continue. If the electrical storage voltage is high, then the chargeable capacity of the capacitor 3 is small. For this reason, the standby power generation starting speed is made lower to delay the start of standby power generation. In FIG. 10, the difference between the dotted line (b) and standby power generation starting speed Vb on the one hand and the dotted line (a) and standby power generation starting speed Va on the other hand is attributable to the electrical storage voltage. The dotted line (a) represents the characteristics in effect when the electrical storage voltage is at a predetermined level, and the dotted line (b) denotes the characteristics in effect when the electrical storage voltage is higher than the predetermined level.

Where the vehicle body speed is in the positive domain, the second requested charging power is made higher on the negative side (discharging side) the higher the vehicle body speed so as to prepare for charging with traveling regeneration and standby power generation, whichever the normal or standby power generation process being underway.

Figure 11A:
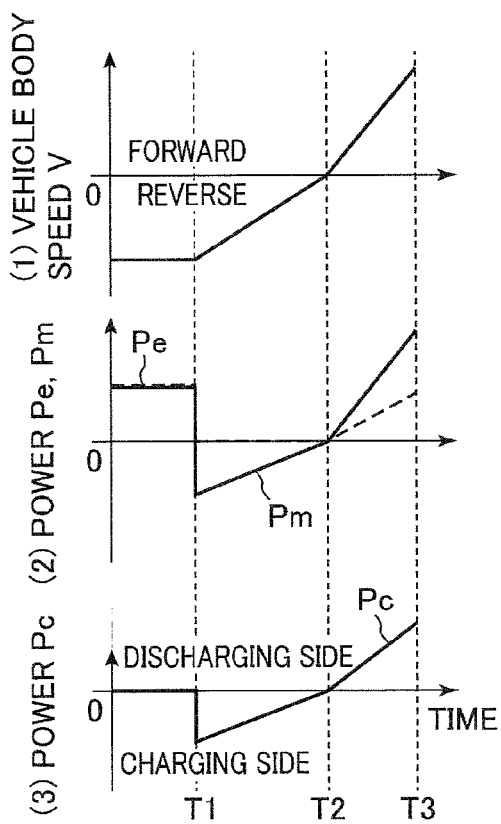
FIG. 11A is a characteristic diagram explaining the operation of the first embodiment of the electrically driven working vehicle of the invention, the characteristics being in effect where the first embodiment is not applied.
Figure 11B:
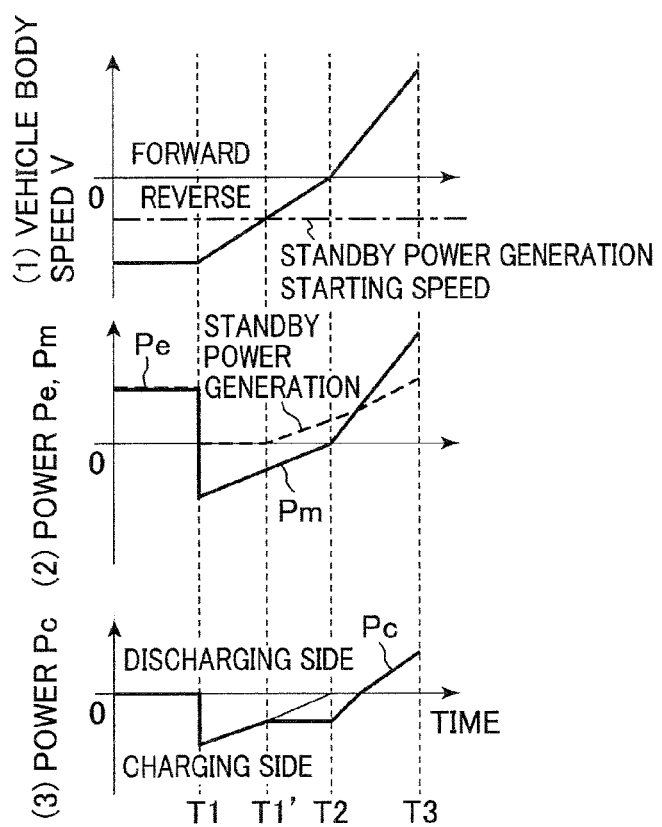
FIG. 11B is a characteristic diagram explaining the operation of the first embodiment of the electrically driven working vehicle of the invention, the characteristics being in effect where the first embodiment is applied.

Explained next with reference to FIGS. 11A and 11B is the operation of the above-described first embodiment of the electrically driven working vehicle of this invention. FIG. 11A is a characteristic diagram explaining the operation of the first embodiment of the electrically driven working vehicle of the invention, the characteristics being in effect where the first embodiment is not applied. FIG. 11B is a characteristic diagram explaining the operation of the first embodiment of the electrically driven working vehicle of the invention, the characteristics being in effect where the first embodiment is applied.

In FIGS. 11A and 11B, the horizontal axis denotes time. On the vertical axis, reference character (1) stands for the vehicle body speed V, (2) for the power Pe and Pm of the engine 1 and traveling motor 7 respectively, and (3) for the power Pc of the capacitor 3. The dotted lines in the drawing represent the power Pe of the engine 1.

FIG. 11A gives the example in effect when standby power generation is not performed in modulation mode (i.e., when this embodiment is not applied). For convenience of explanation, it is assumed that the only load on the engine 1 is the load torque of the motor generator 5 and that the vehicle body is decelerated only with the traveling motor 7.

In the drawing, what is shown up to time T1 is a state in which the vehicle body speed is negative with the vehicle body in reverse. At this time, the traveling motor 7 continues to output power (indicated with a solid line in the second figure from the top) commensurate with travel resistance. The engine 1 outputs the power Pe (indicated with a dotted line in the second figure from the top) approximately equivalent to the power of the traveling motor 7 in order to supply power to the traveling motor 7. In this case, the power Pe supplied from the engine 1 is just enough for the traveling motor 7, so that the power Pc of the capacitor 3 becomes zero.

At time T1, the operator changes the forward/reverse switch to start modulation. This causes the vehicle to decelerate at a constant speed. The power Pm of the traveling motor 7 becomes negative (on the regenerative side). The power Pm regenerated by the traveling motor 7 is charged into the capacitor 3. At this time, there is no need for the engine 1 to supply power to the traveling motor 7, so that the engine 1 enters the idle state and does not output the power Pe. Needless to say, the power Pm regenerated by the traveling motor 7 is approximately proportional to the product of the torque and revolution speed of the traveling motor 7. It follows that the power Pm regenerated by the traveling motor 7 decreases gradually as the vehicle body speed drops.

At time T2, the vehicle body speed becomes positive and the vehicle accelerates in the forward direction. That means the traveling motor 7 needs power to accelerate the vehicle body. At this point, the engine 1 raises its output power Pe to power the traveling motor 7, but there is a delay in the increase of the engine output power Pe. This shortage of power is assisted by discharge from the capacitor 3. If the electrical storage voltage of the capacitor 3 is low at this point, the assistance can be insufficient and traveling acceleration can be delayed correspondingly. Also, the higher the assisting power Pc, the faster the deterioration of the capacitor 3 can become.

FIG. 11B gives the example in effect when this embodiment is applied. What takes place up to time T1' is the same as in FIG. 11A.

At time T1' on the hybrid wheel loader to which this embodiment is applied, the absolute value of the vehicle body speed drops below the standby power generation starting speed, so that standby power generation is started. This subjects the engine 1 to the power generation load for standby power generation, so that the engine output power Pe gradually increases. Also, the power Pe acquired from standby power generation and the power Pm regenerated by the traveling motor 7 are charged into the capacitor 3.

At time T2, the vehicle body speed becomes positive and the vehicle accelerates in the forward direction. Since the engine output power Pe has already been on the rise thanks to standby power generation, the assisting power Pc from the capacitor 3 is lower than when this embodiment is not applied. For this reason, the hybrid wheel loader to which this embodiment is applied receives reduced assisting power Pc from the capacitor 3 and still obtains acceleration at least equivalent to that of torque converter vehicles.

According to the above-described first embodiment of the electrically driven working vehicle of this invention, the amount of electrical power generated by the generator motor 5 is raised while the working vehicle is in modulation mode so as to increase the engine output power Pe in advance. Thus during traveling acceleration following modulation, the electrically driven working vehicle has the assisting power Pc from the capacitor 3 lowered and still achieves acceleration at least equivalent to that of torque converter vehicles. As a result, the forward/reverse switching operation of the electrically driven working vehicle is carried out smoothly, which improves the efficiency of excavating, loading, and transporting earth and sand.

Also according to the above-described first embodiment of the electrically driven working vehicle of this invention, with modulation mode in effect, with the electrical storage voltage of the capacitor 3 lower than the maximum voltage, and with the absolute value of the vehicle body speed lower than the standby power generation starting speed but higher than zero, standby power generation is carried out to bring the amount of power generated by the motor generator 5 higher the closer the absolute value of the vehicle body speed comes to zero. Thus during traveling acceleration following modulation, the assisting power Pc from the capacitor 3 is reduced but acceleration at least equivalent to that of torque converter vehicles can still be obtained.

Second Embodiment

Figure 12:
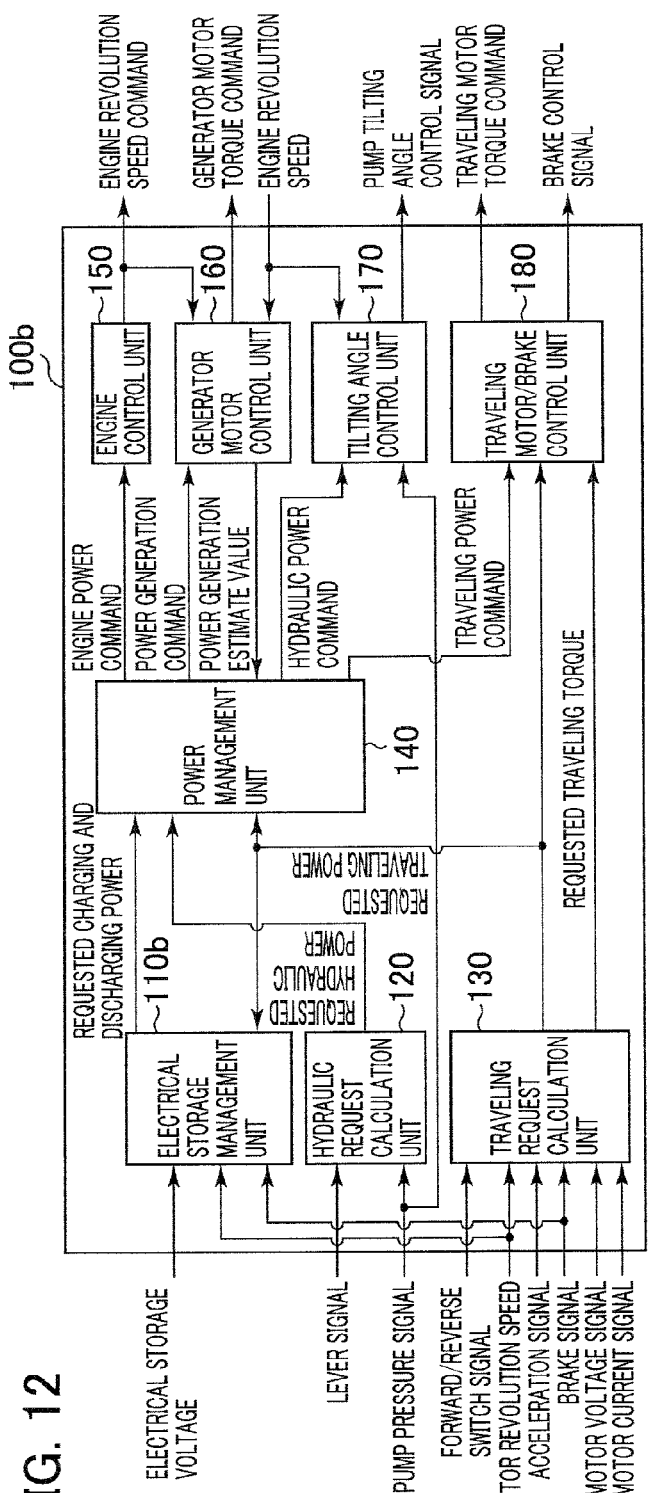
FIG. 12 is a control block diagram of a main controller constituting part of a second embodiment of the electrically driven working vehicle of the invention.
Figure 13:
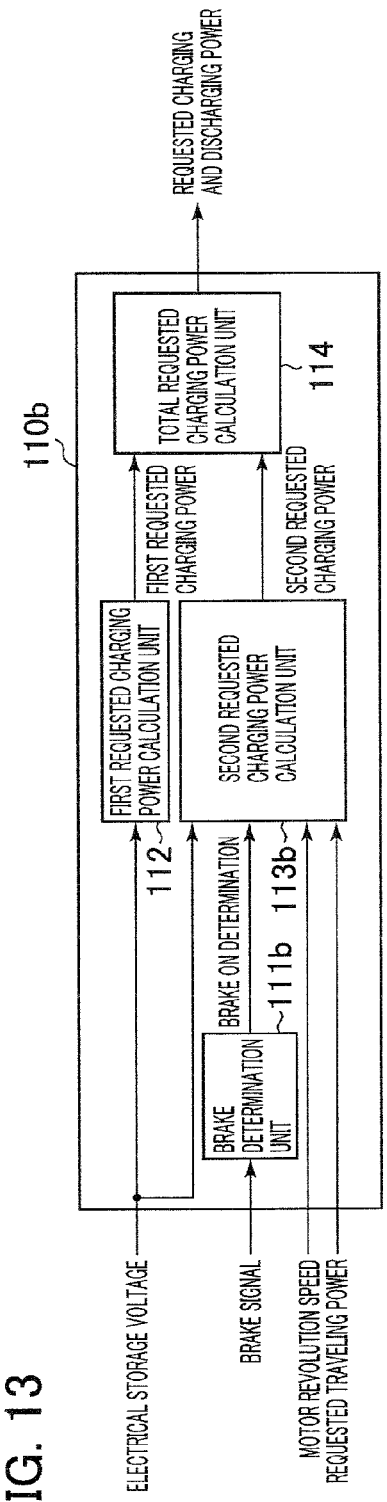
FIG. 13 is a control block diagram showing a structure of an electrical storage management unit constituting part of the main controller in FIG. 12.
Figure 14:
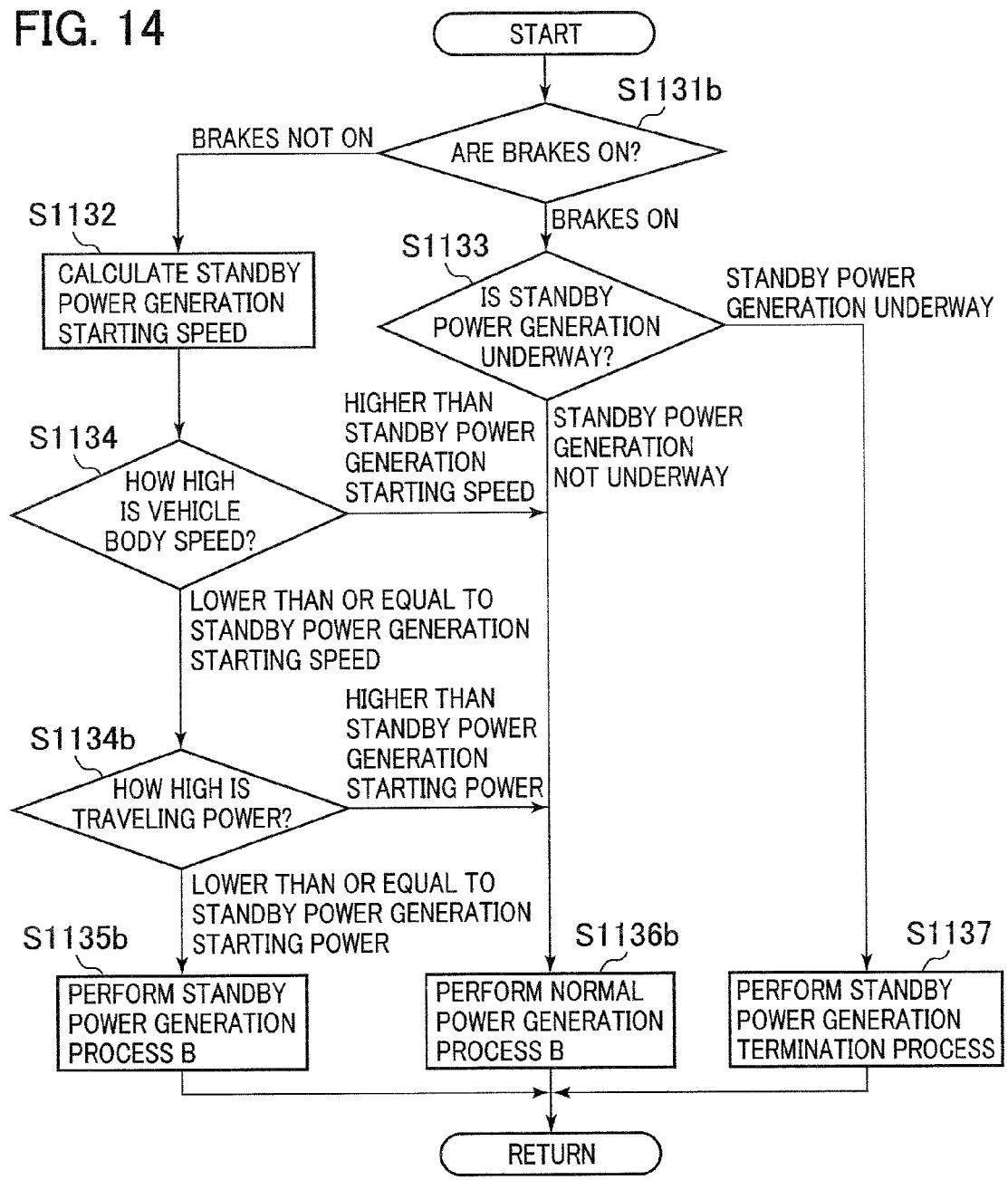
FIG. 14 is a flowchart showing a flow of calculations performed by a second requested charging power calculation unit constituting part of the electrical storage management unit in FIG. 13.
Figure 15:
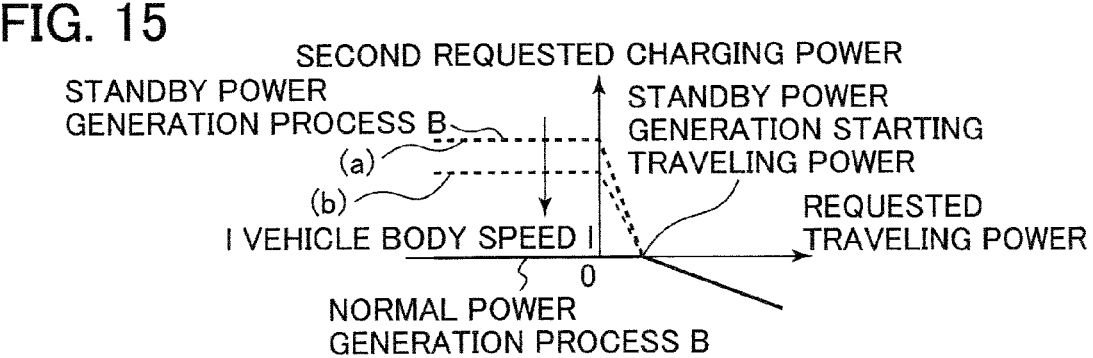
FIG. 15 is a characteristic diagram explaining a normal power generation process B and a standby power generation process B performed by the second embodiment of the electrically driven working vehicle of the invention.

The electrically driven working vehicle as the second embodiment of the present invention is explained below with reference to the relevant accompanying drawings. FIG. 12 is a control block diagram of a main controller constituting part of the second embodiment of the electrically driven working vehicle of the invention. FIG. 13 is a control block diagram showing a structure of an electrical storage management unit constituting part of the main controller in FIG. 12. FIG. 14 is a flowchart showing a flow of calculations performed by a second requested charging power calculation unit constituting part of the electrical storage management unit in FIG. 13. FIG. 15 is a characteristic diagram explaining a normal power generation process B and a standby power generation process B performed by the second embodiment of the electrically driven working vehicle of the invention. In FIGS. 12 through 15, the reference characters used in FIGS. 1 through 11B designate like or corresponding parts, and their explanations are omitted hereunder where redundant.

The second embodiment of this inventive working vehicle is configured with approximately the same electric-hydraulic equipment as that of the first embodiment except that the main controller 100 is replaced with a main controller 100b.

In the main controller 100b shown in FIG. 12, an electrical storage management unit 110b replaces the electrical storage management unit 110 in the main controller 100 of the first embodiment. Also, the electrical storage management unit 110b receives an additional input signal of requested traveling power from the traveling request calculation unit 130 and has the forward/reverse switch signal replaced with a brake signal.

FIG. 13 shows a structure of the electrical storage management unit 110b. In the electrical storage management unit 110b, a brake determination unit 111b and a second requested charging power calculation unit 113b replace the modulation determination unit 111 and the second requested charging power calculation unit 113, respectively, in the electrical storage management unit 110 of the first embodiment.

The brake determination unit 111b calculates a brake ON signal based on the brake signal (as brake determination device). When the brake signal is higher than a predetermined threshold value, e.g., higher than 10% of full braking force, it is determined that the brakes are ON and the brake ON signal is set to be true. Otherwise it is determined that the brakes are not ON and the brake ON signal is set to be false.

The second requested charging power calculation unit 113b calculates the second requested charging power on the basis of the electrical storage voltage, brake ON determination, motor revolution speed, and requested traveling power.

The calculations performed by the second requested charging power calculation unit 113b are now explained below in detail with reference to FIGS. 14 and 15.

FIG. 14 shows a flowchart of the calculations carried out by the second requested charging power calculation unit 113b. In the flowchart, steps S1131, S1135 and S1136 of the first embodiment are replaced respectively with steps S1131b, S1135b and S1136b, and step S1134b is added.

First in step S1131b, it is determined whether the brakes are ON. If it is determined that the brake ON signal is true, step S1133 is reached; if it is determined that the brake ON signal is false, step S1132 is reached.

In step S1132, the standby power generation starting speed is calculated. Step S1132 is followed by step S1134.

In step S1134, it is determined which of the vehicle body speed and the standby power generation starting speed is the higher. If it is determined that the absolute value of the actual vehicle body speed is lower than or equal to the standby power generation starting speed, step S1134b is reached; if it is determined that the absolute value of the actual vehicle body speed is higher than the standby power generation starting speed, step S1136b is reached.

In step S1134b, it is determined which of the requested traveling power and established standby power generation starting traveling power is the higher. If it is determined that the requested traveling power is lower than or equal to the standby power generation starting traveling power, step S1135b is reached; if it is determined that the requested traveling power is higher than the standby power generation starting traveling power, step S1136b is reached. Incidentally, the standby power generation starting traveling power is set to be lower than or equal to the traveling power in effect when the vehicle is traveling at a constant speed in full acceleration on a flat road. Since the traveling power varies with speed, the standby power generation starting traveling power of the hybrid wheel loader may be changed in keeping with variable speed levels that may be reproduced to simulate those of torque converter vehicles.

In step S1135b, the standby power generation underway flag is set to be true, and the standby power generation process is performed. In step S1136b, the standby power generation underway flag is set to be false, and the normal power generation process is carried out. A method for calculating the second requested charging power for the standby and the normal power generation processes will be discussed later.

On the other hand, in step S1133, it is determined whether standby power generation is underway. If it is determined that the standby power generation underway flag is true, step S1137 is reached; if it is determined that the standby power generation underway flag is false, step S1136b is reached.

In step S1137, the standby power generation termination process is performed. The standby power generation termination process involves gradually lowering the second requested charging power to zero and, when the power is reduced to zero, setting the standby power generation underway flag to be false.

The normal power generation process B and the standby power generation process B are now explained below with reference to FIG. 15.

In FIG. 15, the horizontal axis represents the requested vehicle traveling power, and the vertical axis denotes the second requested charging power. In the drawing, thick solid lines stand for the second requested charging power calculated in the normal power generation process B, and dotted lines (a) and (b) represent the second requested charging power calculated in the standby power generation process B.

Where the vehicle body speed is in the negative domain and the brakes are ON, it is determined that the operator has the intention of stopping the vehicle. In this case, the normal power generation process B is performed to bring the second requested charging power to zero.

On the other hand, where the brakes are not ON and the requested traveling power is lower than or equal to the standby power generation starting traveling power, it is determined that it is possible for the operator to proceed with traveling acceleration. In this case, the standby power generation process B is carried out to gradually raise the engine output power in preparation for traveling acceleration. Here, the second requested charging power in the standby power generation process B is brought higher the lower the requested traveling power.

Also, the second requested charging power is made higher on the negative side (discharging side) the higher the requested traveling power is than the standby power generation starting traveling power so as to prepare for charging with traveling regeneration and standby power generation, whichever the normal power generation process B or the standby power generation process B being underway.

When the absolute value of the vehicle body speed is higher, the time required from the time modulation is started until transition to traveling acceleration (i.e., time of standby power generation process B) becomes longer. On the other hand, the power generated by the generator motor 5 charges the capacitor 3 so that, when the maximum voltage of the capacitor 3 is reached during the time of the standby power generation process B, standby power generation cannot continue. For this reason, unnecessary power generation is suppressed by bringing the second requested charging power lower the higher the absolute value of the vehicle body speed. In FIG. 15, the difference between the dotted line (b) and the dotted line (a) is attributable to the absolute value of the vehicle body speed. The dotted line (a) represents the characteristics in effect when the absolute value of the vehicle body speed is at a predetermined level, and the dotted line (b) denotes the characteristics in effect when the absolute value of the vehicle body speed is higher than the predetermined level.

If the vehicle body speed is low at the start of modulation, the time period from the start of modulation until traveling acceleration is so short that even if standby power generation is carried out subsequent to the determination of modulation, the output power of the engine 1 may not be increased in time. However, with the hybrid wheel loader of the second embodiment, the start of modulation is predicted from the drop of the requested traveling power (vehicle body speed in equilibrium), and standby power generation is performed before the start of modulation. This makes it possible to avoid the delay of the output power of the engine 1.

Figure 16A:
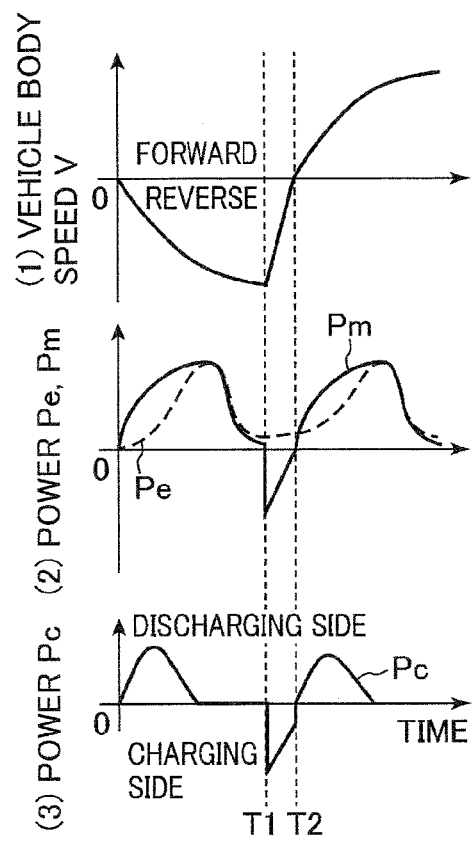
FIG. 16A is a characteristic diagram explaining the operation of the second embodiment of the electrically driven working vehicle of the invention, the characteristics being in effect where the first embodiment is applied.
Figure 16B:
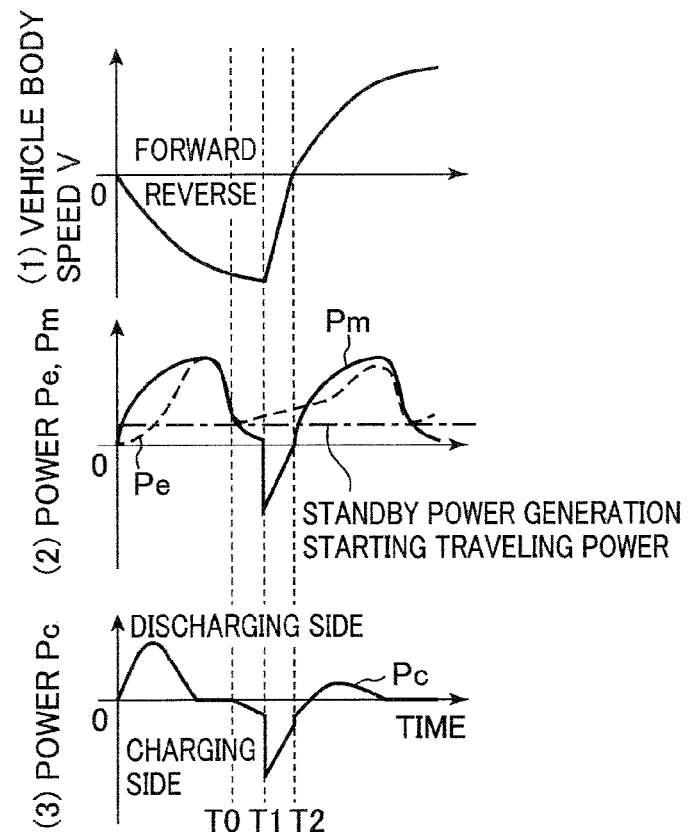
FIG. 16B is a characteristic diagram explaining the operation of the second embodiment of the electrically driven working vehicle of the invention, the characteristics being in effect where the second embodiment is applied.

Explained next with reference to FIGS. 16A and 16B is the operation of the above-described second embodiment of the electrically driven working vehicle of this invention. FIG. 16A is a characteristic diagram explaining the operation of the second embodiment of the electrically driven working vehicle of the invention, the characteristics being in effect where the first embodiment is applied. FIG. 16B is a characteristic diagram explaining the operation of the second embodiment of the electrically driven working vehicle of the invention, the characteristics being in effect where the second embodiment is applied.

In FIGS. 16A and 16B, the horizontal axis denotes time. On the vertical axis, reference character (1) stands for the vehicle body speed V, (2) for the power Pe and Pm of the engine 1 and traveling motor 7 respectively, and (3) for the power Pc of the capacitor 3. The dotted lines in the drawing represent the power Pe of the engine 1.

FIG. 16A gives the example in effect when the first embodiment is applied (i.e., when this embodiment is not applied). For convenience of explanation, it is assumed that the only load on the engine 1 is the load torque of the motor generator 5.

In the drawing, what is shown up to time T1 is a state in which the vehicle body speed is negative with the vehicle body accelerating in reverse. At this time, the traveling motor 7 continues to output power Pm (indicated with a solid line in the second figure from the top) commensurate with traveling acceleration. After reaching a predetermined peak value, the power Pm is lowered from the peak as vehicle acceleration drops. At this point, the engine 1 raises the power Pe (indicated with a dotted line in the second figure from the top) in order to supply power to the traveling motor 7. However, the increase of the power Pe is slow to keep up with the rise of the power Pm of the traveling motor 7. The shortage of power due to the delayed engine output power Pe is assisted by the power Pc discharged from the capacitor 3 (indicated with a solid line in the third figure from the top). The power Pc from the capacitor 3 takes a peak value when the shortage of the engine output power Pe with regard to the rise of the power Pe of the traveling motor 7 is maximum; the power Pc from the capacitor 3 becomes zero when the engine output power Pe has caught up with the power Pm of the traveling motor 7.

At time T1, the operator changes the forward/reverse switch to start modulation. This causes the vehicle to start decelerating, and switches the power Pm of the traveling motor 7 to the negative (regenerative) side. The power Pm regenerated by the traveling motor 7 is charged into the capacitor 3. At this point, if the absolute value of the vehicle body speed is lower than the standby power generation starting speed, standby power generation is started immediately after the start of modulation. The engine 1 is subjected to the power generation load from standby power generation, and the engine output power Pe (indicated with a dotted line in the second figure from the top) gradually increases.

However, if the absolute value of the vehicle body speed at time T1 is relatively low, the time required for switching from modulation to traveling acceleration (time period from time T1 to time T2) is so short that the engine output power Pe may not be sufficiently increased for the vehicle to accelerate in the forward direction. In this case, upon acceleration of the vehicle in the forward direction, there occurs a considerable shortage of the engine output power Pe regarding the increase of the power Pm of the traveling motor 7. This entails increased assisting power Pc from the capacitor 3.

FIG. 16B gives the example in effect when this embodiment is applied. What takes place up to time T0 is the same as in FIG. 16A. At time T0, the power Pm of the traveling motor 7 drops below the standby power generation starting traveling power.

On the hybrid wheel loader to which this embodiment is applied, standby power generation is started at time T0 at which the power of the traveling motor 7 drops below the standby power generation starting power. Thus the engine 1 is subjected to the power generation load from standby power generation, and the engine output power Pe gradually increases. The power Pe obtained from standby power generation is charged into the capacitor 3.

At time T1, the operator changes the forward/reverses switch to start modulation. This causes the vehicle to start decelerating, and switches the power Pm of the traveling motor 7 to the negative (regenerative) side. The power Pm regenerated by the traveling motor 7 is charged into the capacitor 3. At this time, the engine output power Pe also increases gradually.

At time T2, the vehicle body speed becomes positive and the vehicle starts accelerating in the forward direction. By this time, the engine output power Pe has been on the rise thanks to standby power generation, so that there is a reduced shortage of the engine output power Pe with regard to the rise of the power Pm of the traveling motor 7. This makes it possible to the make the assisting power Pc from the capacitor 3 lower than if this embodiment is not applied (i.e., where the first embodiment is applied). The hybrid wheel loader to which this embodiment is applied can thus need reduce assisting power Pc from the capacitor 3 and still obtain acceleration at least equivalent to that of torque converter vehicles.

According to the above-described second embodiment of the electrically driven working vehicle of the present invention, the same effects as those of the first embodiment can be obtained.

Also according to the above-described second embodiment of the electrically driven working vehicle of the present invention, the start of modulation is predicted from the drop of the requested traveling power (vehicle body speed in equilibrium), and standby power generation is performed before the start of modulation. Thus when the vehicle body speed is low at the start of modulation, the output power Pe of the engine 1 can be raised unfailingly even if the time period from the start of modulation until traveling acceleration is very short. As a result, the assisting power Pc from the capacitor 3 may be reduced upon traveling acceleration subsequent to modulation, so that acceleration at least equivalent to that of torque converter vehicles can be obtained.

Whereas the capacitor 3 has been explained above as a typical electrical storage device used in this embodiment, this is not limitative of the present invention. A battery or some other suitable device may be used instead as the electrical storage device.

DESCRIPTION OF REFERENCE CHARACTERS

1: Engine
2: Engine controller
3: Capacitor (electrical storage device)
4: Converter
5: Generator motor
6: Generator inverter
7: Traveling motor
8: Traveling inverter
9: Main pump
100: Main controller
100b: Main controller
102: Brake pedal
103: Forward/reverse switch
104: voltage sensor
105: Current sensor 110: Electrical storage management unit
111: Modulation determination unit (modulation determination device)
111b: Brake determination unit (brake determination device)
113: Second requested charging power calculation unit (requested charging power calculation device)
113b: Second requested charging power calculation unit (second requested charging power calculation device)

The invention claimed is:

1. An electrically driven working vehicle having an engine, a generator motor connected mechanically to the engine, a generator inverter for controlling the amount of power generated by the generator motor, a traveling motor for driving a vehicle body, an electrical storage device connected electrically to the generator inverter and to the traveling motor, and a forward/reverse switch for switching the traveling direction of the vehicle body, the electrically driven working vehicle comprising:
a controller for outputting to the generator inverter an instruction to increase the amount of power generated by the generator motor when the voltage of the electrical storage device is equal to or lower than a maximum voltage level and a speed signal of the traveling motor given upon switching of the forward/reverse switch is equal to or lower than a predetermined speed,
wherein the controller includes a modulation determination unit for determining that modulated operation is underway when a direction indicated by the forward/reverse switch is different from the direction of the speed signal of the traveling motor, the modulation determination unit further determining that unmodulated operation is underway when the direction indicated by the forward/reverse switch is the same as the direction of the speed signal of the traveling motor, and
a requested charging power calculation unit for receiving a modulation determination signal from the modulation determination unit, the requested charging power calculation unit outputting to the generator inverter an instruction to bring the amount of power generated by the generator motor in modulated operation higher than in unmodulated operation when the speed signal of the traveling motor is equal to or lower than a predetermined speed that is higher than zero.

2. The electrically driven working vehicle according to claim 1, wherein, when the voltage of the electrical storage device is equal to or lower than the maximum voltage level and the speed signal of the traveling motor is equal to or lower than a predetermined speed that is higher than zero, the controller outputs to the generator inverter an instruction to bring the amount of power generated by the generator motor higher the closer to zero a speed signal of the traveling motor is gradually reduced.

3. The electrically driven working vehicle according to claim 2, further comprising:
a brake pedal for decelerating the vehicle body;
a sensor for detecting the voltage of the traveling motor; and
a current sensor for detecting the current of the traveling motor,
wherein the controller includes:
a traveling power request calculation unit for calculating requested traveling power by receiving the voltage of the traveling motor detected by the sensor and the current of the traveling motor detected by the current sensor;
a brake determination unit for calculating either a brake ON signal or a brake OFF signal on the basis of a brake signal from the brake pedal; and
a second requested charging power calculation unit for receiving a brake determination signal from the brake determination unit, the second requested charging power calculation unit outputting to the generator inverter the instruction to bring the amount of power generated by the generator motor given the brake OFF signal higher than given the brake ON signal when the requested traveling power from the traveling power request calculation unit is equal to or less than a predetermined power.

4. The electrically driven working vehicle according to claim 2, wherein, the higher the voltage of the electrical storage device detected by a converter, the lower the controller sets the predetermined speed that is higher than zero.

5. The electrically driven working vehicle according to claim 1, further comprising:
a brake pedal for decelerating the vehicle body;
a sensor for detecting the voltage of the traveling motor; and
a current sensor for detecting the current of the traveling motor,
wherein the controller includes:
a traveling request calculation unit for calculating requested traveling power by receiving the voltage of the traveling motor detected by the sensor and the current of the traveling motor detected by the current sensor;
a brake determination unit for calculating either a brake ON signal or a brake OFF signal on the basis of a brake signal from the brake pedal; and
a second requested charging power calculation unit for receiving a brake determination signal from the brake determination unit, the second requested charging power calculation unit outputting to the generator inverter the instruction to bring the amount of power generated by the generator motor given the brake OFF signal higher than given the brake ON signal when the requested traveling power from the traveling request calculation unit is equal to or less than a predetermined power.

6. The electrically driven working vehicle according to claim 5, wherein, the higher the voltage of the electrical storage device detected by a converter, the lower the controller sets the predetermined speed that is higher than zero.

7. An electrically driven working vehicle having an engine, a generator motor connected mechanically to the engine, a generator inverter for controlling the amount of power generated by the generator motor, a traveling motor for driving a vehicle body, an electrical storage device connected electrically to the generator inverter and to the traveling motor, and a forward/reverse switch for switching the traveling direction of the vehicle body, the electrically driven working vehicle comprising:
a converter for detecting the voltage of the electrical storage device; and
a controller for receiving the voltage of the electrical storage device detected by the converter and a speed signal of the traveling motor, the controller further outputting to the generator inverter an instruction to increase the amount of power generated by the generator motor when the voltage of the electrical storage device is equal to or lower than a maximum voltage level and the speed signal of the traveling motor given upon switching of the forward/reverse switch is equal to or lower than a predetermined speed that is higher than zero,
wherein the controller includes a modulation determination unit for determining that modulated operation is underway when a direction indicated by the forward/ reverse switch is different from the direction of the speed signal of the traveling motor, the modulation determination unit further determining that unmodulated operation is underway when the direction indicated by the forward/reverse switch is the same as the direction of the speed signal of the traveling motor, and a requested charging power calculation unit for receiving a modulation determination signal from the modulation determination unit, the requested charging power calculation unit outputting to the generator inverter the instruction to bring the amount of power generated by the generator motor in modulated operation higher than in unmodulated operation when the speed signal of the traveling motor is equal to or lower than the predetermined speed that is higher than zero.

8. The electrically driven working vehicle according to claim 7, wherein, the higher the voltage of the electrical storage device detected by the converter, the lower the controller sets the predetermined speed that is higher than zero.

9. The electrically driven working vehicle according to claim 7, wherein, when the voltage of the electrical storage device is equal to or lower than the maximum voltage level and the speed signal of the traveling motor is equal to or lower than the predetermined speed that is higher than zero, the controller outputs to the generator inverter an instruction to bring the amount of power generated by the generator motor higher the closer to zero the speed signal of the traveling motor is gradually reduced.

10. The electrically driven working vehicle according to claim 7, further comprising:
a brake pedal for decelerating the vehicle body;
a sensor for detecting the voltage of the traveling motor; and
a current sensor for detecting the current of the traveling motor,
wherein the controller includes:
a traveling power request calculation unit for calculating requested traveling power by receiving the voltage of the traveling motor detected by the sensor and the current of the traveling motor detected by the current sensor;
a brake determination unit for calculating either a brake ON signal or a brake OFF signal on the basis of a brake signal from the brake pedal; and
a second requested charging power calculation unit for receiving a brake determination signal from the brake determination unit, the second requested charging power calculation unit outputting to the generator inverter the instruction to bring the amount of power generated by the generator motor given the brake OFF signal higher than given the brake ON signal when the requested traveling power from the traveling power request calculation unit is equal to or less than a predetermined power.

* * * * *